(No Model.)
R. GILLHAM.
CABLE RAILWAY.
No. 345,378. Patented July 13, 1886.
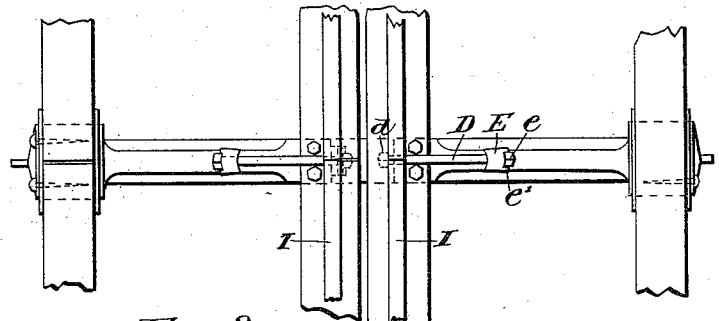
Fig. 1.
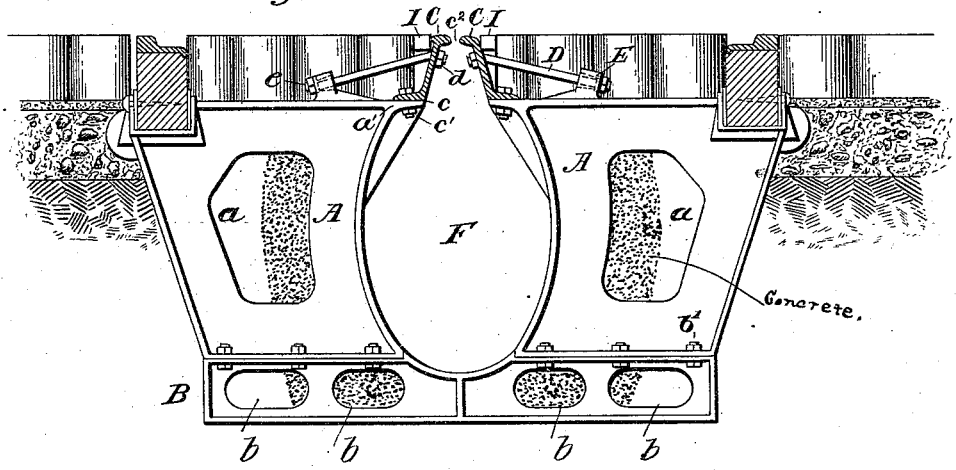
Fig. 2.
Fig. 3.
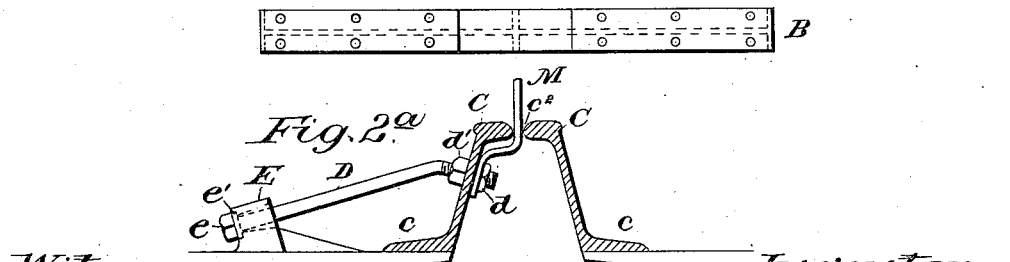
Fig. 2ª
Witnesses:
L. B. Bailey
F. W. Tuttle
Inventor.
Robert Gillham
per Rich'd H. Manning Atty

UNITED STATES PATENT OFFICE.

ROBERT GILLHAM, OF KANSAS CITY, MISSOURI.

CABLE RAILWAY.

SPECIFICATION forming part of Letters Patent No. 345,378, dated July 13, 1886.

Application filed April 27, 1885. Serial No. 163,082. (No model.)

*To all whom it may concern:*

Be it known that I, ROBERT GILLHAM, a citizen of the United States, residing at Kansas City, in the county of Jackson and State of Missouri, have invented certain new and useful Improvements in Cable Railways; and I do hereby declare that the following is a full, clear, and exact description of the invention, which will enable others skilled in the art to which it appertains to make and use the same, reference being had to the accompanying drawings, forming a part of this specification.

The object of my invention is to prevent the slot-rails in cable railways from being thrown out of position or wedged toward each other by outside pressure, the results of which have been to vary the width of the slot and interfere with the passage of the cable-grip, and to afford means for a convenient adjustment of said rails at the required distance apart when a variation from their true position is discovered.

In cable railways a pavement of any description laid between the track-rails and the slot-rails exerts a pressure upon the latter in proportion to its capacity for expansion or from the manner in which it is laid, and also that due to the passage of loaded wagons over the pavements. When wood pavements are used, their expansion under the conditions of moisture, it will be readily seen, has an effect to vary the position of the slot-rails, which is readily counteracted by my invention; and it consists in the means for adjusting the slot-rail laterally to meet the change of position and preserve the requisite width of slot.

My invention also consists in the novel construction of the yoke-beam, wherein the union of the concrete tube with said beam is more effectually accomplished.

In the drawings, Figure 1 is a plan view of a portion of a cable railway, taken on the plane of the yoke. Fig. 2 is a transverse view of a cable railway, showing the yoke and the devices for adjusting the slot-rails. Fig. 2ª is a detail view of the adjusting devices, as seen in Fig. 2, and showing the nuts on opposite sides of the slot-rails. Fig. 3 is a plan view of the yoke-beam.

Similar letters of reference indicate corresponding parts.

A A represent the yoke of a cable railway.

$a\, a$ are the transverse openings through the yoke A.

B is the yoke-beam.

$b\, b$ are the transverse openings through the yoke-beam B.

$b'$ are bolts securing yoke A to beam B.

C C are the slot-rails.

$c\, c$ are flanges on slot-rails C.

$c'$ are bolts, which pass through the flanges $c\, c$ and through the flanges $a'$ of yoke A, securing the slot-rails to the yoke.

$c^2$ is the slot.

D D are the adjusting rods or bars.

$d$ is a nut on the end of rod D, which extends through the slot-rail.

$d'$ is a nut on the rod D, and on the opposite side of slot-rail to nut $d$.

E E are lugs on the upper surface of yoke A.

$e$ is a nut on the end of rod D, which enters the lug E.

$e'$ is a notch or countersink in the lug E, to admit the nut $e$.

F is the tube opening in yoke A.

I I are the longitudinal adjusting-strips on either side of the slot-rails C C.

M is a nut-wrench.

In the construction of my invention I first make a suitable transverse perforation through the slot-rail C, slightly below the slot $c^2$, and in a vertical line with the center of yoke A. I then form upon the upper horizontal surface of the said yoke A, between the slot-rails and the track-rails or stringer-chair, and at a convenient distance from the slot-rails for the proper working of the devices, a lug E, and perforate the said lug in the direction of the slot-rails, slightly inclining the perforation in an upward direction. Upon the outer and perforated end of the lug E, I make a notch or countersunk seat, $e'$, which receives the nut $e$, and prevents it from turning. I then make a rod, D, of a suitable length, to be attached to the lug E, and also to the slot-rails, and upon one end cut a screw-thread, to which end the nut $d'$ is fitted and turned a suitable distance thereon, to permit said end to pass through the perforation in the slot-rails. The said screw-threaded end of rod D is then inserted in the perforation in the slot-rails, the nut $d'$ bearing against the outer side of said rail, and the nut $d$ fitted to the said end of rod D, from the inner side of said rails securing the rod thereto. The opposite end of the rod D is also provided with a screw-thread, and is first bent downwardly at an angle a suitable distance away from the nut $d'$, and passed through the perforation in the lug E, and slightly beyond the said lug, and the nut $e$ fitted thereto.

The adjusting-strips I are made of any suitable material, and in depth to extend from the flange $c$ of the slot-rail, upon which it rests, to the horizontal surface of the said rails. The strips I are cut in the desired lengths to reach from one yoke to an adjoining yoke, and from a continuous outer covering to the sides of the slot-rails, thus giving greater lateral strength to the same, and are beveled upon the surface which fays against the said slot-rails, as seen in the drawings.

In laying the concrete to form the tube, as described in my application filed September 30, 1884, the interior form and dimensions of said concrete tube are made to conform to the central transverse opening, F, in yoke A, which opening is made sufficiently large to operate the cable and the tube serving to conduct the foreign matter which falls through the slot into suitable pits. On either side of the opening F and in the yoke A are the transverse openings $a\ a$. The yoke-beam B, supporting the yoke A, and to which it is bolted, is also provided with transverse openings $b\ b$. The concrete by the means of the openings $a\ a$ and $b\ b$ forms a union with the yoke A, and also with the concrete placed in the continuous formation of the tube on opposite sides of the yoke and beam, thereby giving an increased solidity to the structure.

In the operation of the adjusting-rod D, when it is found necessary to vary the position of the slot-rails C laterally the adjusting-strip I is first removed and tapered to the requisite degree, or a strip of the requisite dimensions made to put in its place. The removal of strip I exposes the nut $d'$ on the rod D, which nut is on the outside and in contact with the slot-rail. The slot-rails C C are then thrown slightly away from each other by releasing the nut $d'$, or allowed to come nearer to each other by releasing the nut $d$ on the said rod D, which nut $d$ is on the inner side of the slot-rails, the nuts $c'$, holding the slot-rails to the yoke A, being first loosened, if necessary, and the said nut $d$ turned to the right or left, as the position of the slot-rails are found to vary from their true relation respecting the width of the slot between the opposite slot-rails.

The position of the slot-rails may be readily varied without necessitating the removal of the pavement or entering the tube for the purpose, to accomplish which I use a nut-wrench, M, suitably bent, which I introduce from without through the slot $c^2$ between the slot-rails, and which wrench engages with the nut $d$ on the end of bolt D.

The advantages of my invention are found of great importance in cable railways, and obviates the disadvantages arising from the compression or variation of the slot-rails referred to, and an increased rigidity is given laterally to said rails, thus more easily resisting lateral pressure.

I do not limit myself in the invention to the precise construction shown; but,

Having fully described my invention, what I claim as new, and desire to secure by Letters Patent, is—

1. In cable railways, the combination of the slot-rails, a lug upon the supporting device for said rails, an adjusting-rod attached to the slot-rail, and also to the lug, and suitable nuts on said rod and on opposite sides of the said slot-rail, adapted to be operated as shown and described.

2. In cable railways, the combination of the slot-rail, a lug provided with a countersink, as described, and arranged upon the supporting device for said rails, an adjusting-rod attached to the slot-rails, and also to the lugs, and suitable nuts on said rod and on opposite sides of the said slot-rail, for the purpose described.

3. The combination, with the slot-rails, of an adjusting-strip, as and for the purpose specified.

4. In cable railways, a yoke-beam having transverse openings whereby a union is formed of the concrete with the said beam and on opposite sides, as shown and described.

In testimony whereof I have hereunto set my hand in the presence of two subscribing witnesses.

ROBERT GILLHAM.

Witnesses:
FRED. W. PERKINS,
JOSEPH N. McGEE.